Dec. 18, 1951     C. F. TAYLOR     2,579,347
COLOR TEMPERATURE METER
Filed Jan. 20, 1950
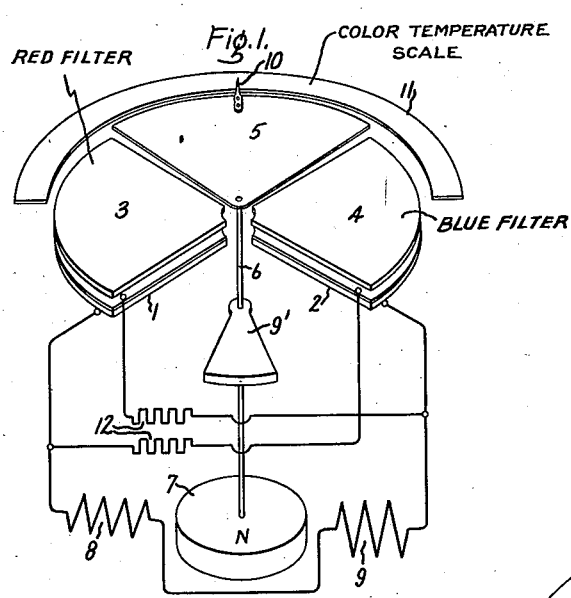
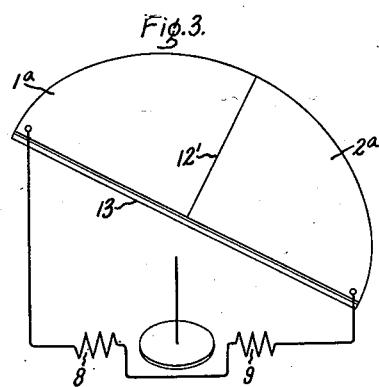
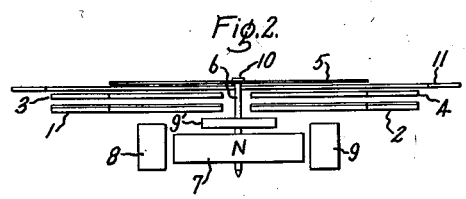
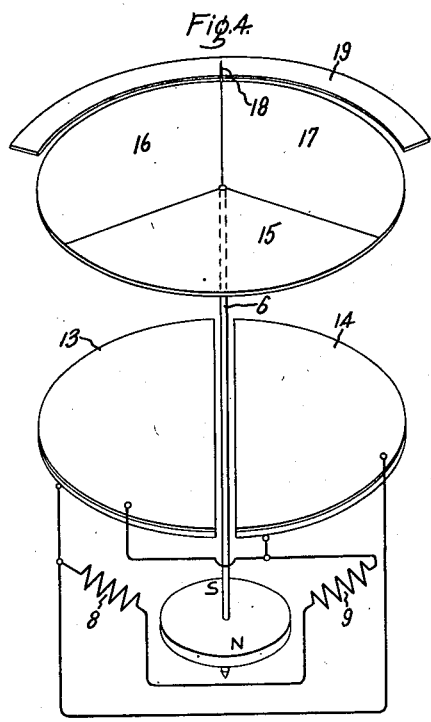
Inventor:
Clement F. Taylor,
by Russell A. Warner
His Attorney.

Patented Dec. 18, 1951

2,579,347

UNITED STATES PATENT OFFICE 2,579,347

COLOR TEMPERATURE METER

Clement F. Taylor, Peabody, Mass., assignor to General Electric Company, a corporation of New York Application January 20, 1950, Serial No. 139,779

8 Claims. (Cl. 88—22.5)

My invention relates to color temperature meters and its object is to provide an instrument of the type described which is simple in construction, low in cost, accurate in operation, has a wide range, and requires no adjustments in its use. An instrument of this type is desirable for the average photographer when using color film, to measure the color of the light available and to match it with the film being used.

In carrying my invention into effect, I preferably employ a single measuring instrument with a permanent magnet armature and stationary winding, and requiring no lead-in spirals, control springs, or zero restoring torque.

The features of my invention which are believed to be novel and patentable will be pointed out in the claims appended hereto. For a better understanding of my invention reference is made in the following description to the accompanying drawings in which Fig. 1 represents a perspective view of a preferred form of my color temperature meter, Fig. 2 a partially sectional side view thereof, Fig. 3 a modified electrical connection and Fig. 4 represents a perspective view of a modified light filtering arrangement. It will be understood that a suitable inclosing case structure not shown will be used.

Referring now to the drawings, 1 and 2 comprise two similar photovoltaic cells, each presenting an area shaped essentially like one-quarter of a circle and occupying approximately diametrically opposite sectors of a common circular area. Masking cell 1 is a red filter 3, and masking cell 2 is a blue filter 4, it being understood that the sensitized surfaces of the cells are uppermost and that the filters are adjacent thereto, preferably such that most of the light influencing the cells must pass through the filters. Thus the filters are in parallel light intercepting relation between the light and cells, part of the light going through one filter to one cell and another part of the light going through the other filter to the other cell. Although it is not necessary that filters cover the entire cells, the filters are preferably of the same size and shape as the cells. Shown occupying approximately another one-quarter of the circular area is a lightweight opaque mask 5 lying in a plane slightly above the plane of the filters 3 and 4, and mounted for rotation about the center of such circle by means of a shaft 6 which extends downward beyond the filters and cells, and on which is a permanent magnet armature 7 of circular formation and polarized across a diameter. A stationary winding consisting of coils 8 and 9 when energized produces a flux approximately diametrically of the armature 7. The shaft 6 is suitably pivoted in bearings and the opaque vane 5 counterbalanced as by a counterbalance indicated at 9'. A pointer index 10 is carried by the shutter vane 5 and indicates on a stationary color temperature scale 11. The scale 11 may specify the filters which should be used over the camera lens for taking pictures on color film, degrees Kelvin or other suitable color temperature units.

The two cells 1 and 2 are connected in series through preferably two similar limiting resistances 12, such that the current cells alternate with the resistances in the series circuit. These resistances 12 are not essential. The winding for the instrument consisting of coils 8 and 9 is connected across the series resistance cell circuit, so that if both cells produce equal outputs, no current will flow in the instrument winding; but so that if the output of cell 1 predominates, current will flow in one direction in the instrument winding, and if the output of cell 2 predominates, current will flow in the instrument winding in the opposite direction. Thus the winding of the instrument is energized in accordance with the idfferential output of the cells. It is to be noted that the instrument requires no lead-in spirals or control springs or zero restoring torque means. The instrument is essentially a polarized reversible motor with an unbiased freely rotatable armature.

In the rotary position of the shutter 5 represented in Fig. 1, equal areas of the cells 1 and 2 will be exposed to light coming in parallel through the filters 3 and 4. If the red and blue components of the light are balanced, the cell outputs will be balanced and no current will flow in the coils 8 and 9, and there will be no deflection of the instrument. If, however, cell 1 receiving the red light component predominates, a current will flow in the instrument winding and the connections are made such that the torque produced by the resulting instrument current is counterclockwise, so that shutter 5 rotates and starts to cover filter 3 and cell 1, thereby reducing the area of cell 1 exposed to light and, therefore, its output. This varies the relative red and blue light reaching the two cells. This continues until the outputs of the two cells are balanced and the shutter 5 comes to rest and its pointer 10 indicates at a new position on scale 11.

If the shutter swings beyond the balance point, the current in the instrument winding immediately reverses and reverses the direction of torque, so that the shutter 5 position is a correct indication of the ratio of red and blue light components of the light under investigation. When the blue in the light predominates, cell 2 will have a higher output per unit area than cell 1 and the shutter 5 will rotate clockwise from the position shown until the exposed area of cell 2 is reduced to a point where the outputs of both cells are balanced. Before using the instrument it is carefully calibrated and scale 11 marked accordingly, using standard light sources the color temperatures of which are known. After such calibration the meter is ready to measure the color quality of light over the complete range from all blue to all red.

It is seen that I have provided a wide range, long scale, simple, low cost, compact, reliable color temperature meter that requires no switching, changing of filters, or other adjustment by the user.

Changes may be made in the relative sizes and shapes of the cells, filters and mask without departing from my invention. The instrument represented has a maximum range of rotation and scale length of 180 degrees. Preferably, the range is made slightly less than 180 degrees by providing a slight angle between the axes of alignment of the coils 8 and 9 as indicated in Fig. 1, to reduce the possibility of a dead-center torque condition.

Instead of the connection used in Fig. 1, the connection represented in Fig. 3 may be used. In Fig. 3 the cells 1a and 2a are connected in series bucking relation through the instrument winding comprising coils 8 and 9. By so doing, the photocells may first be made as a single cell and then the active material cut through as by a center line 12' to provide two cells with a common conductor backing plate 13 which provides the series connection between the cells. The filters and movable shutter are not shown in Fig. 3, but the shutter may be the same as in Fig. 1 and lie half over each cell in the center position. If, then, cell 2a produces the greatest voltage, current will flow in the instrument in a direction to uncover more of cell 1a and less of cell 2a until the cell voltages are again balanced. The instrument winding is energized in accordance with the differential output of the cells.

Instead of providing stationary filters and a movable shutter as in Fig. 1, I may omit the shutter and rotate the filters in the manner represented in Fig. 4. In Fig. 4, 13 and 14 represent two semicircular cells with their light sensitive surfaces uppermost. These cells are connected in series to the instrument as in Fig. 1. On shaft 6 of the instrument and above the cells is a filter disk having equal area green, red, and blue sectors 15, 16, and 17. Such filter disk also carries a pointer index 18 indicating on a color temperature scale 19. In the central position shown if the light passing through the filters has equal amounts of red and blue components, no current will flow in the instrument circuit. If a blue or bluish green color predominates, current will flow from cell 14 in the instrument circuit in a direction to rotate the filter disk counterclockwise until the cell voltages are again balanced. If a red or reddish green color predominates, the filter disk will rotate clockwise to a position where the prevailing color of light falls equally on each cell. The maximum scale range would be 120 degrees, 60 degrees each way from the position shown. In this modification the green filter section could be omitted and the red and blue sections enlarged to half circle areas. Also, instead of having distinct divisions between the red and green and between the blue and green, the coloring could be shaded so as gradually to change from full red to full blue. The scale is calibrated in degrees Kelvin or other suitable color quality units.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A color temperature meter comprising a pair of similar photovoltaic cells, light intercepting means in the path of light to said cells including a red filter and a blue filter in parallel light intercepting relation, a portion of said light intercepting means being adjustable to vary the relative magnitude of the filtered light of one of said colors reaching one cell as compared to the magnitude of the filtered light of the other of said colors reaching the other cell, an electrical instrument having a two-pole permanent magnet pivotally mounted and freely rotatable armature, the adjustable portion of said light intercepting means being movable directly by and with said armature, and a stationary field winding for said instrument connected directly to said cells so as to be energized in response to the differential output of said cells, and which when energized determines the rotary movement of said armature, the rotation of said armature in response to such differential cell output being in a direction to equalize the output of said cells.

2. A color temperature meter comprising a pair of photovoltaic cells, an electrical instrument comprising a two-pole permanent magnet armature freely pivoted for rotation, and a stationary field winding which when energized determines the armature rotary movement, direct electrical connections between said cells and field winding for energizing said winding in accordance with the differential output of such cells, adjustable light intercepting means including color filters having different color filtering characteristics positioned in parallel intercepting relation with respect to light reaching said cells, and means operated solely by the rotation of said instrument armature for directly adjusting said light intercepting means and the relative magnitude of filtered light of one of said color characteristics reaching one cell as compared to the magnitude of filtered light of another of said color characteristics reaching the other cell until the output of said cells is equal.

3. A color temperature meter comprising a pair of similar photovoltaic cells, light intercepting means including red and blue color filters interposed in parallel in the path of light to said two cells, an electrical instrument having a reversible freely mounted armature, direct energizing connections from said cells to said instrument to cause the instrument to respond to the differential electrical output of said cells, and means directly and solely operated by the movement of said instrument when energized for producing relative movement between said two cells and a portion of said light intercepting means to vary the relation between the red component of light influencing one of said cells as compared to the blue component of light influencing the other cell, said movement being in such a direction as to equalize the outputs of said cells and deenergize the instrument.

4. A color temperature meter comprising a pair of photovoltaic cells, adjustable means positioned in front of said cells for filtering light to said cells and varying the relative amount of red and blue light influencing one cell as compared to the other cell, a reversible electrical instrument having a freely movable armature, direct electrical connections from said two cells to said electrical instrument so as to energize the instrument in response to the differential output of said two cells, and mechanical means directly connected between said instrument armature and said adjustable means for operating said adjustable means by and in accordance with any movement of the armature when the instrument is energized, such adjustment being in a direction to reduce the differential output of said cells.

5. A color temperature meter comprising a pair of photovoltaic cells, adjustable color filtering means interposed in parallel in the light path to said cells for filtering the light and varying the ratio between red and blue light influencing one cell as compared to the other cell, an instrument having a field winding and a freely rotatable polarized armature sensitive to the direction of the current in the field winding, connections between said cells and field winding for directly energizing the latter by and in response to the differential output of said cells, a direct mechanical connection between said armature and adjustable color filtering means for operating the latter in a direction which will reduce the differential output of the cells to zero, and means for indicating the rotary position of said armature in terms of color temperature.

6. A color temperature meter comprising a pair of similar photovoltaic cells, a filter of one color in the path of light to one cell and a filter of a different color in the path of light to the other cell, a movable shutter for differentially admitting light of said different colors through said filters to said two cells, an electrical instrument having a field winding and a freely movable polarized armature, direct electrical connections from said cells to said field winding for energizing the latter by and in accordance with the differential output of said cells, a direct mechanical connection between said armature and shutter for moving the latter by the former in a direction to reduce the differential cell output to zero, and means for indicating the rotary position of said armature and shutter in terms of color temperature.

7. A color temperature meter comprising a pair of similar photovoltaic cells, movable color filter means for filtering light to said cells and for varying by its adjustment the relative amount of red light on one cell as compared to the blue light on the other cell, electrically operated reversible motor means energized solely by the differential output of said cells for directly and automatically adjusting said color filter means to reduce the differential output of said cells to zero, and means for indicating the adjustment of said filter means in terms of color temperature.

8. A color temperature meter comprising a pair of similar photovoltaic cells, differently colored light filters in parallel in the path of light rays to said cells, means for adjusting the relative amount of light of one of said colors on one cell in relation to the amount of light of another of said colors on the other cell, electrically operated reversible motor means energized solely by the differential output of said two cells for directly and automatically operating said adjusting means in a direction to reduce such differential output to zero, and means for indicating such adjustment in terms of color temperature.

CLEMENT F. TAYLOR.

REFERENCES CITED

The following references are of record in the file of this patent:

UNITED STATES PATENTS

| Number | Name | Date |
| --- | --- | --- |
| 2,198,971 | Neufeld | Apr. 30, 1940 |
| 2,302,554 | Kingsbury | Nov. 17, 1942 |
| 2,319,212 | Cooley | May 18, 1943 |
| 2,330,877 | Fleisher et al. | Oct. 5, 1943 |
| 2,365,601 | Sipman | Dec. 19, 1944 |
| 2,439,373 | Stearns | Apr. 6, 1948 |
| 2,503,768 | Riszdorfer | Apr. 11, 1950 |

FOREIGN PATENTS

| Number | Country | Date |
| --- | --- | --- |
| 508,802 | Great Britain | July 5, 1939 |

OTHER REFERENCES

Journal of Scientific Instruments, vol. 6, December, 1929, pages 374 to 379. Published by Cambridge University Press, London.